United States Patent [19]

Tindall

[11] Patent Number: 4,549,625

[45] Date of Patent: Oct. 29, 1985

[54] INSTRUMENT PANEL COVER ASSEMBLY

[75] Inventor: Gary W. Tindall, Hazel Green, Wis.

[73] Assignee: Deere & Company, Moline, Ill.

[21] Appl. No.: 584,190

[22] Filed: Feb. 27, 1984

[51] Int. Cl.[4] ...................... B60K 20/08; B62D 25/14; A47B 88/00

[52] U.S. Cl. ........................................ 180/90; 296/70; 312/322

[58] Field of Search ........................ 180/90 R; 296/70; 312/322, 323; 70/159

[56] References Cited

U.S. PATENT DOCUMENTS 3,913,701 10/1975 Williams .............................. 296/70
4,112,718 9/1978 Logsdon et al. ...................... 70/159
4,373,665 2/1983 Dietzsch .............................. 180/90

Primary Examiner—John J. Camby

[57] ABSTRACT

An open rectangular frame surrounds a group of instruments. A cover is slidably and pivotally mounted to the frame for movement between an operative position wherein it overlaps a majority of the frame and blocks access to the instruments surrounded by the frame, and a stored position wherein the cover rests on an upper surface of a console housing the instruments. The connection between the cover and frame is such that the cover has a portion which overhangs the area of the console carrying the instruments so as to reduce glare and thereby make reading of the instruments easier.

4 Claims, 3 Drawing Figures

INSTRUMENT PANEL COVER ASSEMBLY

BACKGROUND OF THE INVENTION

The present invention relates to vehicle vandal protection and more particularly relates to instrument panel cover assemblies.

It is necessary to provide industrial tractors, that do not have a cab, with some means to protect their instrument panels from the elements and vandalism.

It is desirable to provide instrument panel cover assemblies which are constructed for giving a good measure of protection to the vehicle gauges and other instruments when the vehicle is left unattended and which are constructed with the cover mounted for being easily movable to a non-use or stored position when the operator desires to drive the vehicle.

The prior art includes many different designs of panel cover assemblies but they suffer from one or more of the disadvantages of lacking overall simplicity, being ineffective to adequately protect the vehicle gauges and the like and being difficult to move between operative and stored positions.

Now there is provided an instrument panel cover assembly which overcomes all of the aforementioned disadvantages of the prior art and which has additional advantages as well.

SUMMARY OF THE INVENTION

According to the present invention there is provided an improved instrument panel cover assembly.

An object of the invention is to provide a simple, effective and easy-to-operate cover assembly.

A more specific object of the invention is to provide a cover assembly including a cover mounted for easy movement between an operative position covering a control console and a stored position resting on top of the console and disposed at approximately ninety degrees to its operative position.

A further object is to provide a cover assembly wherein the cover has a portion which overhangs the instrument containing area of a control console when the panel is in its stored position and thereby reduces glare so as to make the instruments more visible to the operator.

These and other objects, which will be more apparent from a reading of the description below together with the appended drawing are accomplished by a cover assembly briefly described as follows. The cover assembly includes an upstanding, rectangular frame mounted to a control console in bordering relationship to a plurality of instruments such as gauges and dials which are desired to be protected. The top of the rectangular frame defines a pair of transversely spaced, upwardly projecting ears. A cover, which is rectangular in plan view, has marginal flanges for fitting down over the rectangular frame. Formed on the underside of the cover is a pair of parallel ribs which project above the top flange of the cover. The ribs are aligned with the ears of the frame and contain respective elongate openings which are received on pins carried by the ears so that the cover may be moved between operative and stored positions by sliding it on and pivoting it about the pins. A key operable lock is mounted in a lower part of the cover and includes a tang mounted for releasable engagement with a locking tab formed in the lower edge of the frame when the cover is in its operative position.

DESCRIPTION OF THE PREFERRED EMBODIMENT

Figure 1:
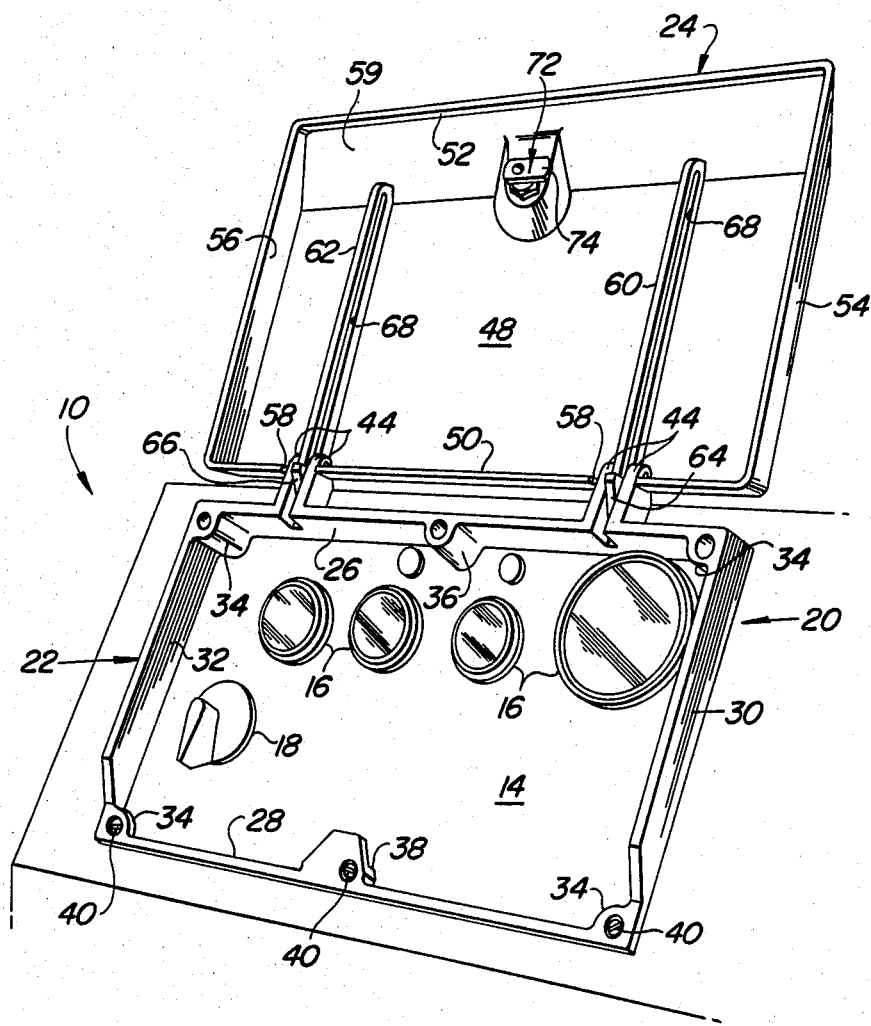
FIG. 1 is a top right perspective view of a vehicle control console showing an instrument panel and a protective cover assembly therefor with the cover being shown in a raised position exposing the instruments it protects when closed.

Referring now to the drawing, there is shown a vehicle control console 10 including an upwardly and rearwardly facing instrument panel 12 including an area 14 containing a plurality of instruments including a plurality of gauges 16 and at least one dial 18.

A cover assembly 20 made of a molded plastic having a high impact resistance is provided for pretecting the instruments from damage when the vehicle is left unattended. Specifically, the assembly 20 includes an open rectangular cover mounting frame 22 and a cover 24, which is rectangular in plan view. The mounting frame 22 includes top, bottom, righ and left sides 26, 28, 30 and 32, respectively, which, except for thickened areas 34 at the corners of the frame and thickened areas 36 and 38 respectively intermediate the ends of the top and bottom sides 26 and 28, are relatively narrow. Also, it is to be noted that the height of the top, right and left sides 26, 30 and 32, respectively, is approximately twice that of the bottom side 28. A plurality of fasteners 40 are respectively received in holes provided in the thickened areas 34, 36 and 38 and are received in respective holes arranged in a rectangular pattern in the panel 12 so as to hold the frame in surrounding relationship to the instrument carrying area 14. The thickened area 38 of the bottom side 32 defines a locking tab 42 (FIG. 3) which is spaced above the panel 12. Joined at right angles to and projecting upwardly from the top side 26 of the frame 22 are first and second transversely spaced pairs of ears 44, with the ears of each pair being spaced from each other.

Figure 3:
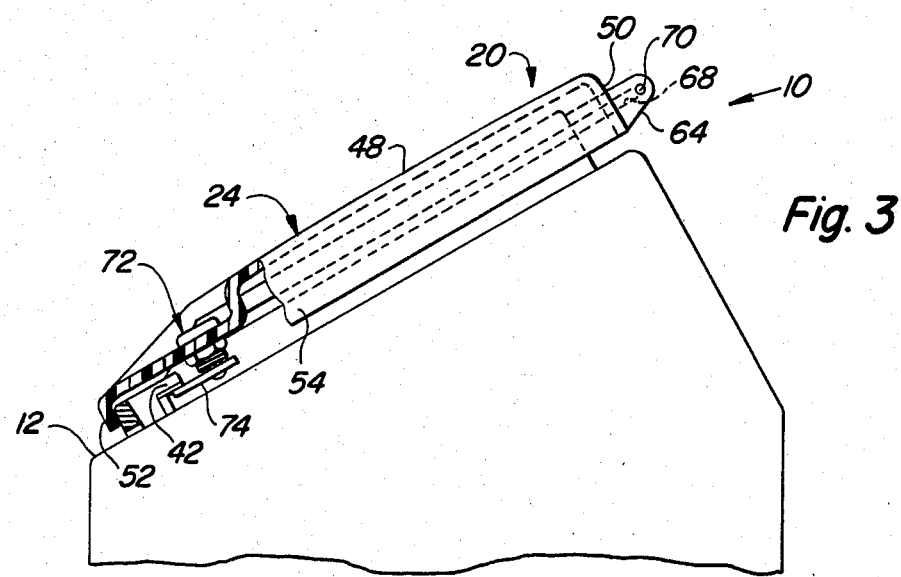
FIG. 3 is a view similar to FIG. 1 but showing the cover in an operative or closed position covering instruments mounted in the console.

The cover 24, as viewed perpendicular to its top in FIG. 3, includes a rectangular top wall 48 joined to top, bottom, right and left depending flanges 50, 52, 54 and 56, respectively, which overlap the corresponding sides 26, 28, 30 and 32 of the frame 22. Thus, the cover 24 is disposed over all except the ears 44 of the frame 22 and over the instruments located within the frame. The top flange 52 contains a pair of notches 58 (FIG. 1) which respectively receives the first and second pairs of ears 44 of the frame 22. First and second ribs 60 and 62 are formed on the bottom of the top wall 48 of the cover 24 and extend parallel to the right and left flanges 54 and 56. Upper end portions 64 and 66, respectively, of the ribs 60 and 62 project through the notches 58 and are received between the ears of each pair of ears 44. Lower ends of the ribs 60 and 62 terminate above a bottom portion 59 of the cover. The ribs 60 and 62 each include an elongate opening 68 which extends the length thereof. A pair of pins 70, respectively, extends through the first and second ears 44 and is received in a respective opening 68 and thereby secures the cover 24 to the frame 22. A key operable lock 72 is located in a lower portion of the cover 24 midway between the ribs 60 and 62. The lock 72 includes a pawl or tang 74 which may be selectively rotated beneath the locking tab 42 of the frame 22 so as to releasably retain the cover in its operative position shown in FIG. 1.

Figure 2:
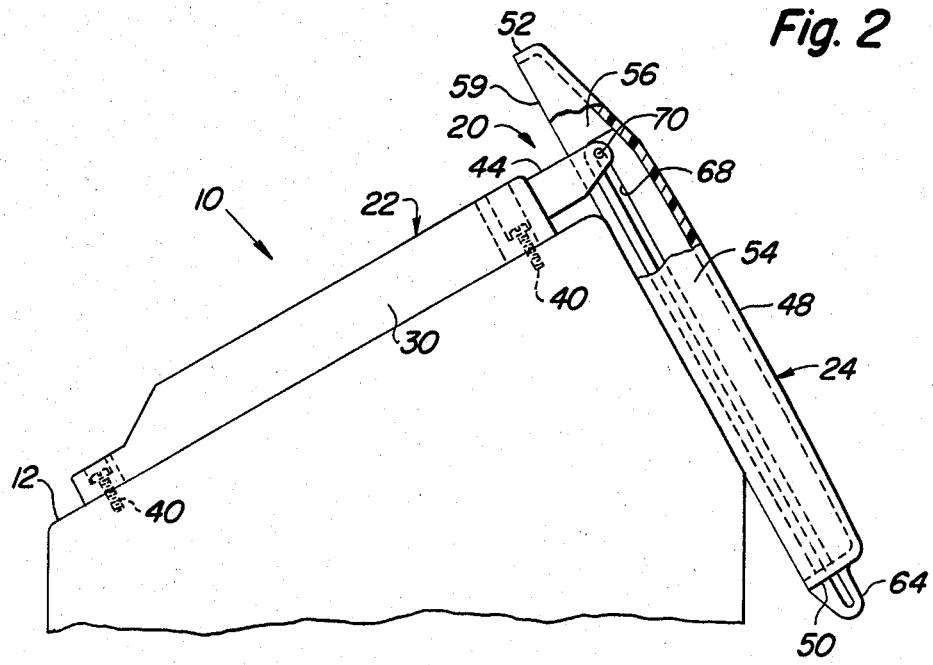
FIG. 2 is a left side elevational view of the console and cover assembly showing the cover in an inoperative or stored position exposing instruments mounted in the console.

In operation of the assembly 20, the cover 24 may be moved from its operative position (FIG. 3) to its stored position (FIG. 2) by first inserting a key in the lock 72 and then rotating the tang 74 free of the tab 42. The cover 24 may then be pivoted vertically on the pins 70 to a position about halfway between its operative position and its raised position and then slid or shifted to its stored position (FIG. 2) where it lies on a top surface of the console 10. In its stored position, the pins 70 are located in the bottom ends of the openings 68 in the ribs 60 and 62 and support the cover 24 such that the bottom portion 59 thereof overhangs the top of the panel area 14 so as to reduce the glare that might otherwise occur due to the sun shining on the instruments.

Having described the preferred embodiment, it will be apparent that modification can be made without departing from the scope of the invention as defined in the accompanying claims.

I claim:

1. In combination with a vehicle control console including an upwardly and rearwardly facing instrument panel having a plurality of instruments mounted therein, an instrument panel cover assembly comprising: an open mounting frame secured to the panel in surrounding relationship to said instruments; said frame including a pair of laterally spaced projections extending above an upper margin of said console; a cover shaped complementary to the frame and having peripheral flange means for overlapping the frame when the cover is in an operative position blocking access to said instruments; said cover including a pair of spaced parallel ribs integral with a bottom surface thereof and extending in a direction from top to bottom of the cover; said pair of ribs each containing an elongate opening therein extending the length thereof and having upper ends projecting beyond an uppermost portion of said flange means when the cover is in its operative position; pin means received through said laterally spaced projections and through each elongate opening and thereby shiftably and pivotably mounting said cover to said frame; a key operable lock mounted to a portion of said cover opposite from the projecting ends of said ribs and including a revolvable tang; a locking tab formed integrally with a lower portion of said frame and being spaced above said panel for permitting the tang to be rotated therebeneath when the cover is in its operative position; and said ribs being located relative to said projections of the frame for permitting the cover to be, once unlocked, pivoted about said pin means and slid to a stored position on top of said console.

2. The combination defined in claim 1 wherein said frame is rectangular and has relatively narrow top, bottom, right and left sides and wherein the flange means of said cover includes corresponding top, bottom, right and left flanges.

3. The combination defined in claim 2 wherein the ribs terminate short of a lower end portion of the cover whereby the lower end portion of the cover overhangs the instrument panel when the cover is in its stored position.

4. The combination defined in claim 3 wherein said frame and cover are made of a molded plastic having high impact resistance.

* * * * *